United States Patent [19]

Fraidlin et al.

[11] Patent Number: 5,754,413
[45] Date of Patent: May 19, 1998

[54] REDUCED VOLTAGE STRESS ASYMMETRICAL DC-TO-DC CONVERTER USING FIRST AND SECOND TRANSFORMERS HAVING DIFFERING TURNS RATIOS

[75] Inventors: Simon Fraidlin, Plano, Tex.; Valery I. Meleshin, Moscow, Russian Federation; Rais K. Miftakhutdinov, Moscow, Russian Federation; Alexey V. Nemchinov, Moscow, Russian Federation

[73] Assignee: Lucent Technologies Inc., Murray Hill, N.J.

[21] Appl. No.: 709,564

[22] Filed: Sep. 6, 1996

Related U.S. Application Data

[60] Provisional application No. 60/012,442 Feb. 23, 1996.

[51] Int. Cl.[6] ................................................ H02M 3/22
[52] U.S. Cl. ................................................ 363/16; 363/17
[58] Field of Search .................................... 363/16, 17, 132

[56] References Cited

U.S. PATENT DOCUMENTS

| | | | |
|---|---|---|---|
| 4,017,783 | 4/1977 | Assow et al. | 321/2 |
| 4,323,736 | 4/1982 | Strickland | 179/111 R |
| 4,761,727 | 8/1988 | Kammiller | 363/17 |
| 5,126,931 | 6/1992 | Jitaru | 363/21 |
| 5,231,563 | 7/1993 | Jitaru | 363/98 |
| 5,268,830 | 12/1993 | Loftus, Jr. | 363/17 |
| 5,291,382 | 3/1994 | Cohen | 363/16 |
| 5,488,465 | 1/1996 | Yoshida et al. | 363/16 |
| 5,654,868 | 8/1997 | Buer | 361/256 |

OTHER PUBLICATIONS

Article entitled "Asymmetrical Duty Cycle Permits Zero Switching Loss in PWM Circuits with No Conduction Loss Penalty" by Paul Imbertson and Ned Mohan.
IEEE Transactions on Industry Applications, vol. 29, No. 1, Jan./Feb. 1991, pp. 121–125.
Article entitled "Soft–Switched DC/DC Converter with PWM Control" by R. Oruganti, P.C. Heng, J. Tan K.G., Liew A.C.
INTELEC '93 Record, 1993, vol. 1, pp. 341–349.

*Primary Examiner*—Peter S. Wong
*Assistant Examiner*—Derek J. Jardieu

[57] ABSTRACT

A voltage stress (e.g., reverse voltage stress) in rectifying diodes of, for instance, an asymmetrical DC-to-DC converter is reduced by using a transformer circuit having multiple power transformers with a composite static transfer characteristic. More specifically, the static transfer characteristic is selected to be monotonic in combination with the transformer circuit including two transformers, having independent isolated cores, coupling an input to output of the converter. A primary to secondary winding ratio of each of the two transformers is selected in such a way as to achieve a reduction in reverse voltage in at least one of the rectifying diodes. The reduction in the reverse voltage and, hence, improved efficiency of the rectifier is directly translatable into an increase in a power density of the converter.

26 Claims, 4 Drawing Sheets

REDUCED VOLTAGE STRESS ASYMMETRICAL DC-TO-DC CONVERTER USING FIRST AND SECOND TRANSFORMERS HAVING DIFFERING TURNS RATIOS

CROSS-REFERENCE TO RELATED APPLICATION

The present application is based on a provisional application entitled "Reduced Voltage Stress Asymmetrical DC-to-DC Converter" by Fraidlin, et al., application SER. No. 60/012,442, filed on Feb. 23, 1996, commonly assigned with the present invention and incorporated herein by reference as if reproduced herein in its entirety.

TECHNICAL FIELD OF THE INVENTION

This present invention is directed, in general, to DC-to-DC power converters and, more specifically, to a DC-to-DC converter that reduces a voltage stress across switching components therein.

BACKGROUND OF THE INVENTION

In a search for DC-to-DC power converters, providing higher power densities in connection with a new class of DC-to-DC converters, designated asymmetrical DC-to-DC converters, is currently ongoing. Examples of asymmetrical DC-to-DC converters are disclosed in U.S. Pat. No. 5,291,382, entitled "Pulse Width Modulated DC/DC Converter with Reduced Ripple Current Component Stress and Zero Voltage Switching Capability," by Cohen, U.S. Pat. No. 5,268,830, entitled "Drive Circuit for Power Switches of a Zero-Voltage Switching Power Converter," by Loftus, U.S. Pat. No. 5,231,563, entitled "Square Wave Converter having an improved Zero-Voltage Switching Operation," by Jitaru and U.S. Pat. No. 5,126,931, entitled "Fixed Frequency Single Ended Forward Converter Switching at Zero Voltage," by Jitaru. The converters are designed to operate at ever higher efficiencies. The higher efficiencies may be attained by reducing the dissipative effect of individual circuit components of the converter.

Reducing dissipation of the converter's power switch, by achieving zero-voltage switching ("ZVS"), is a very common choice for component voltage stress reduction, but unfortunately other components, not dealt with by ZVS, such as the rectifier diodes exhibit significant voltage stress. In fact, the reverse voltage stress on the rectifier diodes increases with a widening of the input voltage range that the converter accommodates. This input voltage range is important to the commercial success of a converter design, in that a wide range of input voltage is desirable.

Accordingly, what is needed in the art is a power converter and power circuitry that reduces the voltage stress across switching components therein.

SUMMARY OF THE INVENTION

To address the above-discussed deficiencies of the prior art, the present invention provides a transformer circuit for use in a power converter and a method of operation thereof.

A voltage stress (e.g., reverse voltage stress) in rectifying diodes of, for instance, an asymmetrical DC-to-DC power converter is reduced, according to the principles of the present invention, by using the transformer circuit having multiple power transformers with a composite static transfer characteristic. More specifically, the static transfer characteristic is selected to be monotonic in combination with a transformer circuit including two transformers, having independent isolated cores, coupling an input to output of the converter. A primary to secondary winding turns ratio of the two transformers 110, 120 are essentially different and, more specifically, the primary to secondary turns ratios $N_{110}$, $N_{120}$, respectively, are selected to achieve a reduction in reverse voltage in at least one of the rectifying diodes. With the reduction in the reverse voltage across a rectifying diode, the converter may employ lower voltage rated and, therefore, more efficient rectifying diodes. Additionally, the reduction in the dissipation of the rectifying diodes and corresponding improved efficiency is directly translatable to an increase in the power density of the converter.

In an alternative embodiment of the present invention, the turns ratios $N_{110}$, $N_{120}$ of the transformers 110, 120 are selected as a function of an input voltage range ("K", where, for instance, $K=E_{max}/E_{min}$) of the converter, and, in a related but alternative embodiment, a duty cycle (e.g., D and 1-D) of power switches of a power train of the converter to minimize the reverse voltage stress on one of the rectifying diodes. A nomograph, demonstrating the above referenced relationships, will hereinafter be submitted that represents, for a given turns ratio of the transformers, the reverse voltage stress on the rectifying diodes as a function of the input voltage range of the converter.

The foregoing has outlined, rather broadly, alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

DETAILED DESCRIPTION

Figure 1:
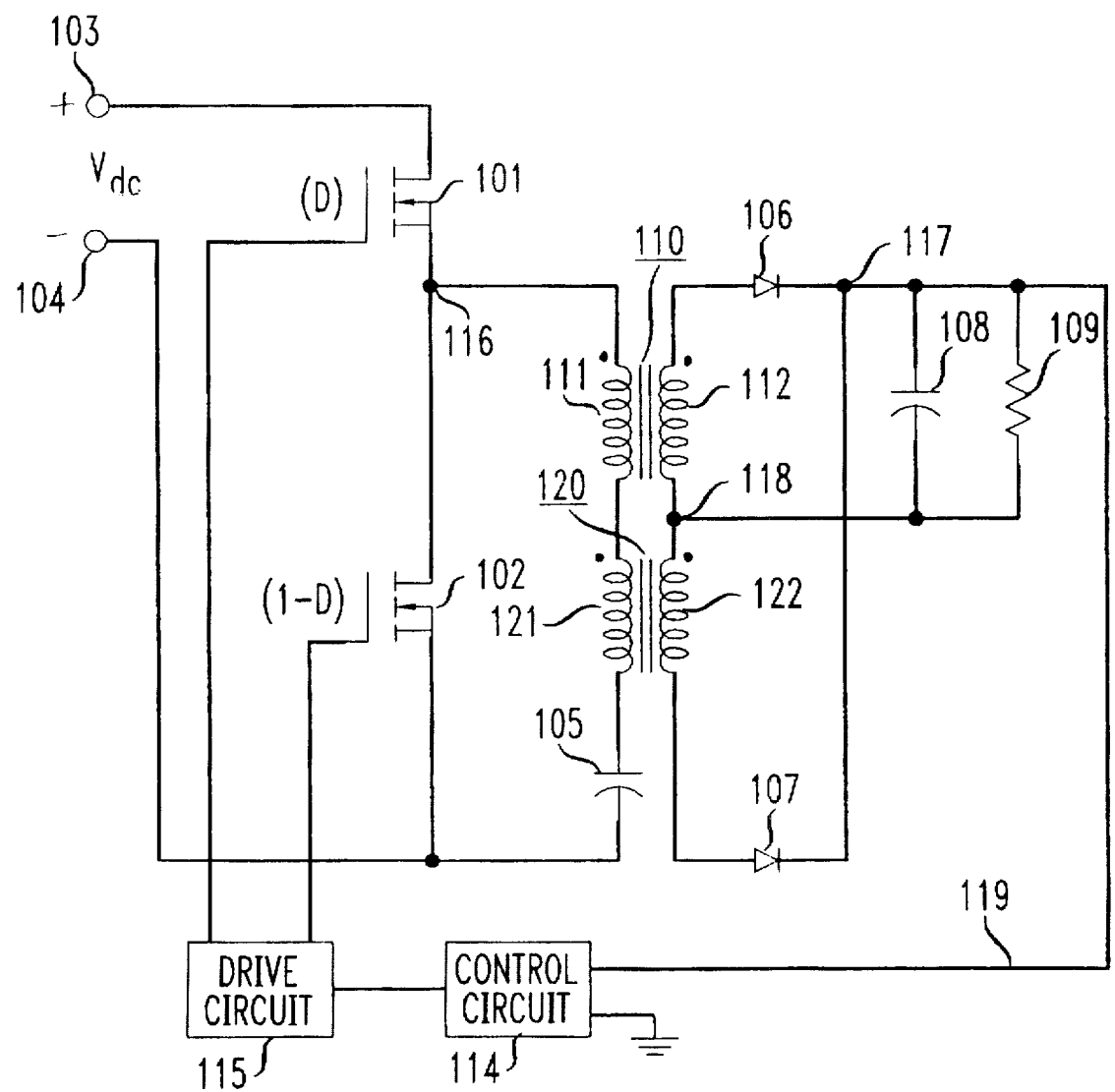
FIG. 1 illustrates a schematic diagram of an embodiment of an asymmetrical half-bridge DC-to-DC converter embodying the principles of the invention.

Referring initially to FIG. 1, illustrated is a schematic diagram of an embodiment of an asymmetrical half-bridge DC-to-DC converter embodying the principles of the invention. The asymmetrical half-bridge DC-to-DC converter, featuring zero-voltage switching ("ZVS") of FET power switches 101, 102, has an input 103, 104 for receiving a DC voltage. The FET switches 101, 102 are connected in a half-bridge configuration with two transformers 110, 120, with primary windings 111, 121 that are connected in series. A node 116 common to both the FET switches 101, 102 is connected to the primary winding 111 and the return terminal 104 is connected through a capacitor 105 to the primary winding 121. The secondary winding 112 of the transformer 110 is connected through a rectifying diode 106 to a load resistor 109. Similarly, the secondary winding 122 of the transformer 121 is connected through rectifying diode 107 to the load resistor 109 and rectifying diode 106 at a node 117. A node 118, connected in common to both of the secondary windings 112, 122, is connected to a load 109. A filtering capacitor 108 is connected in parallel with the load resistor 109.

In operation, the DC voltage output is monitored by a control circuit 114, via lead 119. The control circuit 114 compares the voltage on the lead 119 with a reference voltage and generates an error voltage that is applied to a drive circuit 115. The drive circuit 115 has two outputs applied to the gates of the FET switches 101, 102, respectively. The FET switches 101, 102 are alternately driven into conduction in a complementary way for a duration represented by a duty cycle D and 1-D, respectively.

The rectifier diodes 106, 107 conduct in corresponding segments of the switching cycle D and 1-D, respectively. The voltage stress across the diodes 106, 107 is described by an expression (1) in terms of an output voltage $V_O$ and the duty cycle D. These expressions reveal the asymmetry in the voltage stress between the rectifying diode.

$$V_{106} = V_O/(1-D) \text{ and } V_{107} = V_O/D \tag{1}$$

On the other hand, the expression for static voltage transfer ratio between the converter input and output, expressed in terms of the primary/secondary turns ratio of each of the two transformers 110, 120 and the related conducting intervals of the two power FET switches 101, 102 is illustrated in expression (2).

$$V_O/E_{in} = D(1-D)/[N_{110}D + N_{120}(1-D)] \tag{2}$$

These expressions are applied to develop plotted curves that identify the circuit operating parameters that provide minimization of the reverse voltage for the rectifying diodes 106, 107.

Figure 4:
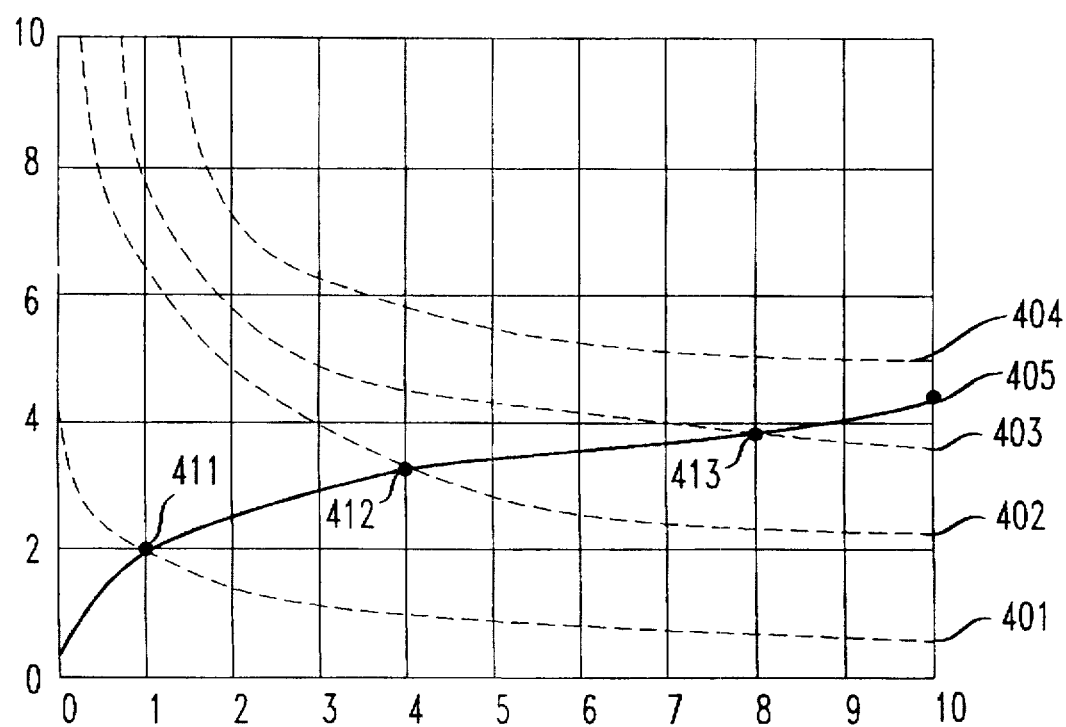
FIG. 4 illustrates a nomograph of a reverse voltage stress on rectifying diodes relative to an input voltage range of the DC-to-DC converter of FIG. 1.

With continuing reference to FIG. 1 and also referring to FIG. 4, the expressions (1), (2) define a nomograph illustrating the normalized reverse voltage stress on the rectifying diodes 106, 107 (namely: $V_{106}/V_O$ and $V_{107}/V_O$) as a function of the normalized input voltage range ($K = E_{in\ max}/E_{in\ min}$) in correlation between the turns ratios $N_{110}$ and $N_{120}$ of the transformers 110, 120. The abscissa of the nomograph is divided into equal intervals designated 0 through 10 that represents varying ratios "x" (where $x = N_{120}/N_{110}$) of the turns ratio of the transformers 110, 120. The ordinate axis of the nomograph represents a reverse voltage of the rectifier diodes 106, 107 that is normalized with respect to the output voltage of the converter.

The nomograph contains a plurality of curves 401, 402, 403, 404 relating to the rectifying diode 107. Each curve demonstrates that the stress on the rectifying diode 107 changes with a variation of the ratio "x." The curves are given for some representative discrete values of the normalized input voltage range (e.g., K=1, K=1.5, K=2.2 and K=3). Additionally, a curve 405 represents a locus of the reverse voltage across the first rectifier diode 106 having a single trajectory for all the values of the input voltage range. As illustrated by the nomograph, the curve 405 intersects the curves 401, 402, 403, 404 at nodes 411, 412, 413 defining critical operating points optimized in such a way as to minimize the voltage stress across the rectifying diodes 106, 107. The overall reverse voltage across the rectifying diodes 106, 107 is minimized at a point where the loci of the stress for the rectifying diode 106 intersects the loci of the stress for the rectifying diode 107 and, hence, represents an optimum point of choice for the ratio of "x" to maximize the power density (by the selection of lower voltage and more efficient diodes) of the converter.

Figure 2:
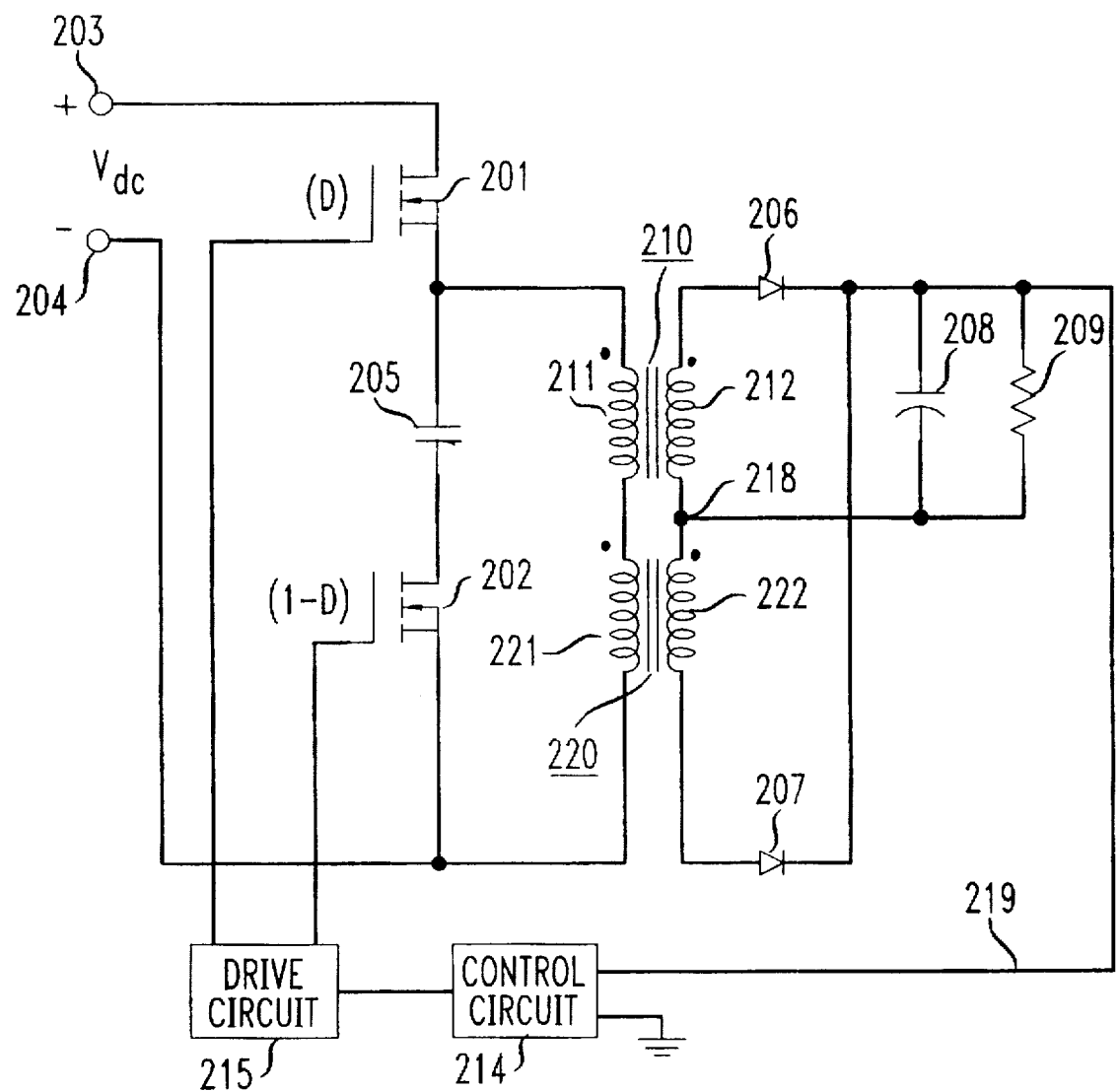
FIG. 2 illustrates a schematic diagram of an embodiment of an asymmetrical DC-to-DC forward converter with active clamp embodying the principles of the invention.

Turning now to FIG. 2, illustrated is a schematic diagram of an embodiment of an asymmetrical DC-to-DC forward converter with active clamp embodying the principles of the invention. In the illustrated embodiment, two FET power switches 201, 202 are connected to one another through a capacitor 205. The FET power switch 202 and capacitor 205 are coupled across the primary windings 211, 221 of the transformers 210, 220, respectively. A secondary winding 212 of the transformer 210 is connected to an output load 209 through a rectifying diode 206; a secondary winding 222 of the transformer 220 is connected through a rectifying diode 207 to a load 209. Again, the FET power switches 201, 202 are alternately activated to operate for a duration represented by duty cycles D and 1-D, respectively. The feedback control for the converter is provided by a control circuit 214 and a drive circuit 215. To enhance an efficiency of the converter (by reducing the reverse voltage in the rectifying diodes 206, 207), it is preferable to determine the turns ratios $N_{210}$ and $N_{220}$ of the two transformers 210, 220 that allow the rectifying diodes 206, 207 to operate with a minimum composite reverse voltage.

Analogous to the discussion provided with respect to FIG. 1, the turns ratios of the transformers 210, 220 may be selected through employing a nomograph as illustrated in FIG. 4. Through use of a nomograph, the operating points are determined such that at least one rectifier diode has a reduced reverse voltage thereby enhancing an overall efficiency of the converter.

Figure 3:
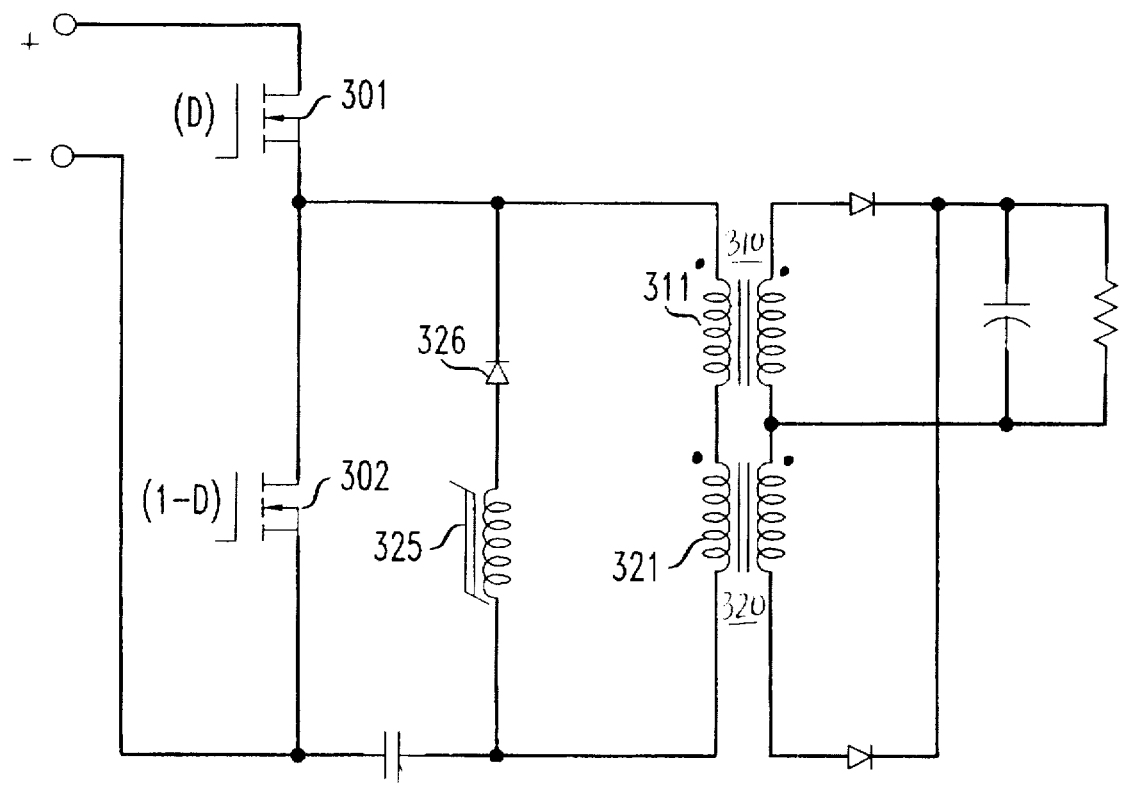
FIG. 3 illustrates a schematic diagram of another embodiment of an asymmetrical half-bridge DC-to-DC converter embodying the principles of the invention.

Turning now to FIG. 3, illustrated is a schematic diagram of another embodiment of an asymmetrical half-bridge DC-to-DC converter embodying the principles of the invention. The illustrated embodiment presents a swinging inductor 325 to further ensure ZVS in at least one of a pair of FET power switches 301, 302. The primary windings 311, 321 of two power transformers 310, 320 are connected in series. The swing inductor 325 and a diode 326 are connected in series and the swing inductor 325 and diode 326 are connected in parallel with a series connection of the primary windings 311, 321 of the transformers 310, 320, respectively. It is important to note that an operation of the converter as a voltage regulator regarding an output voltage $V_O$ thereof results in a substantially constant [volt X second] product across the swinging inductor 325. Therefore, a maximum current $i_{max}$ in the swing inductor 325 is preferably well defined. Analogous to the discussions with respect to FIGS. 1 and 2, the turns ratios $N_{310}$, $N_{320}$ of the power transformers 310, 320, respectively, are determined to reduce the reverse voltage of at least one of a pair of rectifying diodes 306, 307.

The swinging inductor 325 is designed with a sufficient energy storage capacity to achieve ZVS for the FET power switch 301. The energy is stored in the swinging inductor 325 during a conduction of the FET power switch 302. The energy storage is desirable since the leakage inductance of the power transformers 310, 320 may not store sufficient energy to achieve ZVS under all operational conditions.

Figure 5:
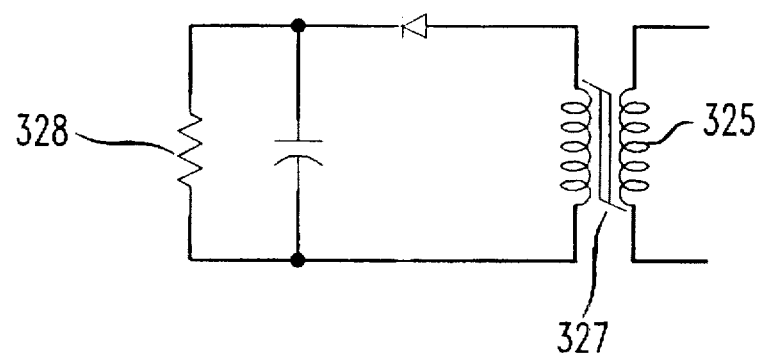
FIG. 5 illustrates a schematic diagram of an embodiment of the swing inductor of FIG. 3.

Turning now to FIG. 5, illustrated is a schematic diagram of an embodiment of the swing inductor 325 of FIG. 3. The swing inductor 325 in the illustrated embodiment also includes a secondary winding 327 from which a regulated voltage may be derived to power ancillary circuitry of the converter. The voltage is regulated due to the [volt X second] limiting of the swing inductor 325 as previously described above.

Figure 6:
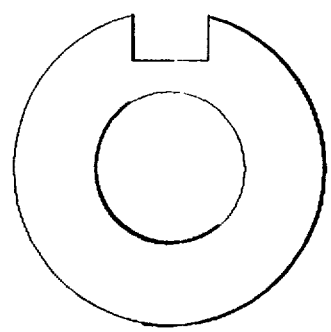
FIG. 6 illustrates a schematic diagram of a magnetic core employable in the swing inductor of FIG. 3.

Turning now to FIG. 6, illustrated is a schematic diagram of a magnetic core employable in the swing inductor 325 of FIG. 3. The construction of the magnetic core of the swing inductor 325 may be a toroid with a partial gap in a portion of the periphery of the core as illustrated.

Figure 7:
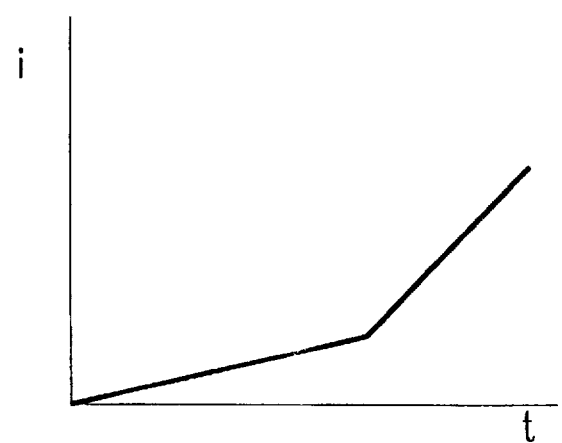
FIG. 7 illustrates a graph of the current versus time for the swing inductor of FIG. 5 employing the magnetic core of FIG. 6.

Turning now to FIG. 7, illustrated is a graph of the current versus time for the swing inductor 325 of FIG. 5 employing the magnetic core of FIG. 6. As evident from the graph, the swing inductor 325 provides a distinct advantage over employing another device such as a nonsaturable inductor. By storing the necessary amount of energy for each switching cycle to obtain proper ZVS switching in the FET power switch 301, the average current in the swing inductor 310 is substantially smaller than in a regular inductor. As a result, the dissipation in the FET power switch 302 is reduced thereby enhancing an overall efficiency in the converter.

Although the present invention has been described in detail, those skilled in the art should understand that they can make various changes, substitutions and alterations herein without departing from the spirit and scope of the invention in its broadest form.

What is claimed is:

1. For use in a power converter having a power train couplable to a source of electrical power and further having a rectifier subject to stress during a reverse voltage condition, a transformer circuit, comprising:

a first transformer having a primary winding coupled to said power train and a secondary winding coupled to said rectifier, said first transformer further having a first turns ratio ($N_1$), said first transformer passing a first portion of electrical power through said converter; and a second transformer having a primary winding coupled to said power train and a secondary winding coupled to said rectifier, said second transformer further having a second turns ratio ($N_2$), said second transformer passing a second portion of electrical power through said converter, $N_1$ being different from $N_2$ to thereby reduce said stress on said rectifier during said reverse voltage condition.

2. The transformer circuit as recited in claim 1 wherein $N_1$ and $N_2$ are selected as a function of an input voltage to said converter.

3. The transformer circuit as recited in claim 1 wherein said power train is coupled to a control circuit and drive circuit for controlling an activation of at least one power switch associated with said power train.

4. The transformer circuit as recited in claim 1 wherein said rectifier comprises at least one rectifying diode.

5. The transformer circuit as recited in claim 1 wherein said rectifier is coupled to an output filter for providing a filtered output voltage at an output of said converter.

6. The transformer circuit as recited in claim 1 wherein said power train comprises a first and second alternately-conducting power switch having a duty cycle (D) and (1-D), respectively, $N_1$ and $N_2$ being selected as a function of D and 1-D.

7. The transformer circuit as recited in claim 6 wherein said inductor is connected to a diode.

8. The transformer circuit as recited in claim 6 wherein said primary winding of said first transformer and said primary winding of said second transformer are connected to an inductor thereby enhancing zero voltage switching (ZVS) across at least one of said first and second power switches.

9. The transformer circuit as recited in claim 8 wherein said inductor comprises a winding thereby providing a regulated voltage in said converter.

10. For use in a power converter having a power train couplable to a source of electrical power and further having a rectifier subject to stress during a reverse voltage condition, a method for reducing said stress on said rectifier with a transformer circuit, comprising the steps of:

passing a first portion of electrical power through a first transformer containing a primary winding coupled to said power train and a secondary winding coupled to said rectifier, said first transformer having a first turns ratio ($N_1$), and passing a second portion of electrical power through a second transformer containing a primary winding coupled to said power train and a secondary winding coupled to said rectifier, said second transformer having a second turns ratio ($N_2$), $N_1$ being different from $N_2$ to thereby reduce said stress on said rectifier during said reverse voltage condition.

11. The method as recited in claim 10 further comprising the step of selecting $N_1$ and $N_2$ as a function of an input voltage to said converter.

12. The method as recited in claim 10 further comprising the step of controlling an activation of at least one power switch associated with said power train with a control circuit and drive circuit.

13. The method as recited in claim 10 wherein said rectifier comprises at least one rectifying diode.

14. The method as recited in claim 10 further comprising the step of filtering an output voltage of said converter with an output filter.

15. The method as recited in claim 10 wherein said power train comprises a first and second alternately-conducting power switch having a duty cycle (D) and (1-D), respectively, the method for reducing further comprising the step of selecting $N_1$ and $N_2$ as a function of D and 1-D.

16. The method as recited in claim 15 further comprising the step of enhancing zero voltage switching (ZVS) across at least one of said first and second power switches with an inductor connected to said primary winding of said first transformer and said primary winding of said second transformer.

17. The method as recited in claim 16 further comprising the step of providing a regulated voltage in said converter with a winding coupled to said inductor.

18. The method as recited in claim 16 wherein said inductor is connected to a diode.

19. A power converter, comprising:

a power train couplable to a source of electrical power;

a rectifier subject to stress resulting from a reverse voltage condition therein;

a transformer circuit, comprising:

a first transformer having a primary winding coupled to said power train and a secondary winding coupled to said rectifier, said first transformer further having a first turns ratio ($N_1$), said first transformer passing a first portion of electrical power through said converter, and a second transformer having a primary winding coupled to said power train and a secondary winding coupled to said rectifier, said second transformer further having a second turns ratio ($N_2$), said second transformer passing a second portion of electrical power through said converter, $N_1$ being different from $N_2$ to thereby reduce said stress on said rectifier during said reverse voltage condition.

20. The converter as recited in claim 19 wherein $N_1$ and $N_2$ are selected as a function of an input voltage to said converter.

21. The converter as recited in claim 19 wherein said rectifier comprises at least one rectifying diode.

22. The converter as recited in claim 19 wherein said rectifier is coupled to an output filter for providing a filtered output voltage at an output of said converter.

23. The converter as recited in claim 19 wherein said power train comprises a first and second alternately-conducting power switch having a duty cycle (D) and (1-D), respectively, $N_1$ and $N_2$ being selected as a function of D and 1-D.

24. The converter as recited in claim 21 wherein said primary winding of said first transformer and said primary winding of said second transformer are connected to an inductor thereby enhancing zero voltage switching (ZVS) across at least one of said first and second power switches.

25. The converter as recited in claim 24 wherein said inductor comprises a winding thereby providing a regulated voltage in said converter.

26. The converter as recited in claim 24 wherein said inductor is connected to a diode.

* * * * *